Sept. 26, 1961   J. H. BARTHOLOMEW   3,001,367
HYDRAULIC ELEVATOR CONTROL SYSTEM
Filed Oct. 1, 1956   5 Sheets-Sheet 2

Inventor:
James H. Bartholomew
By
Atty.

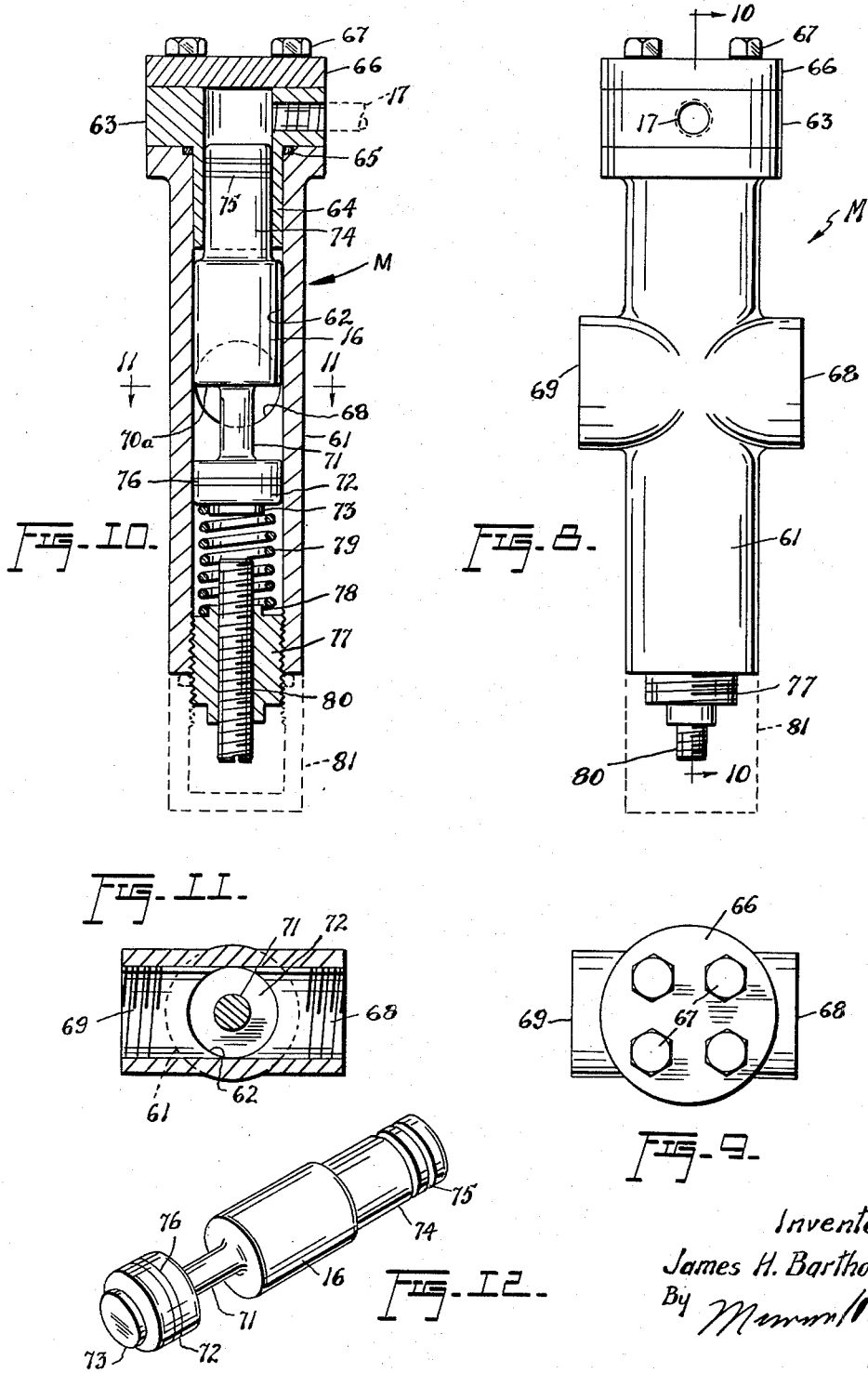

Sept. 26, 1961  J. H. BARTHOLOMEW  3,001,367
HYDRAULIC ELEVATOR CONTROL SYSTEM
Filed Oct. 1, 1956  5 Sheets-Sheet 4
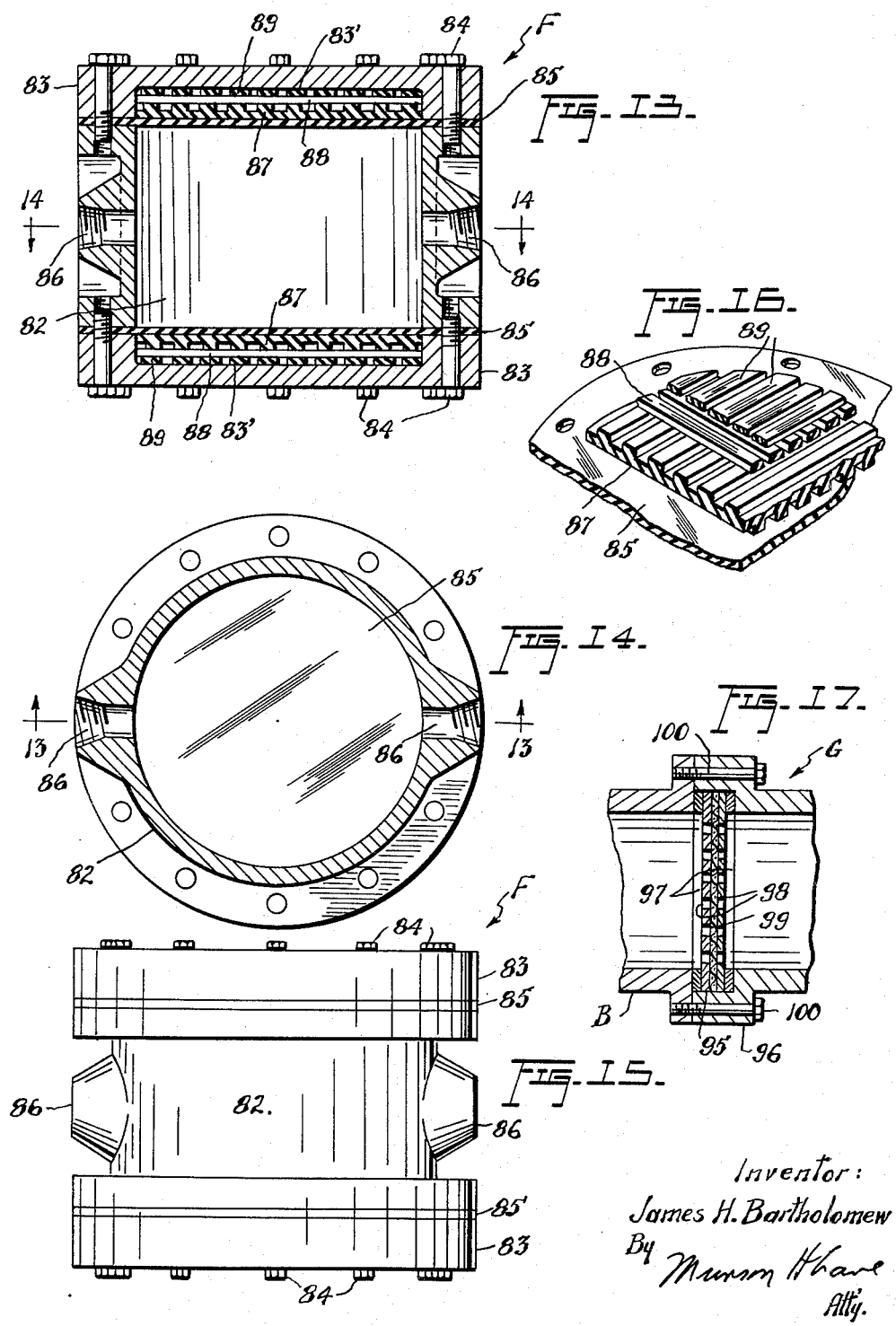
Inventor:
James H. Bartholomew
By Munson Hoare
Atty.

Sept. 26, 1961 J. H. BARTHOLOMEW 3,001,367
HYDRAULIC ELEVATOR CONTROL SYSTEM
Filed Oct. 1, 1956 5 Sheets-Sheet 5

INVENTOR
James H. Bartholomew
BY
ATTORNEY

United States Patent Office 3,001,367
Patented Sept. 26, 1961

1

3,001,367
HYDRAULIC ELEVATOR CONTROL SYSTEM
James H. Bartholomew, Greensboro, N.C., assignor to Monarch Elevator & Machine Co., Inc., Greensboro, N.C.
Filed Oct. 1, 1956, Ser. No. 613,003
8 Claims. (Cl. 60—52)

This invention relates to new and useful improvements in operating systems for hydraulic elevators, and the principal object of the invention is to facilitate smooth, efficient and dependable operation of such elevators at low cost and with ease of maintenance.

As such, one important feature of the invention resides in the provision of improved valve assemblies for controlling the starting and stopping of the elevator car in both upward and downward directions, these valve assemblies being provided with means for adjusting the same as to speed of response in accordance with the particular requirements of the installation where the system is used, so that shocking or jarring of the elevator car by abrupt starting or stopping is eliminated and smooth car travel results.

Another important feature of the invention lies in the operation of the accelerating valve, it being held open by hydraulic means and closed gradually by pressure from the pump, giving smooth starts at all loads. It also serves as an unloading valve when the motor and pump are slowing down preparatory to stopping, thereby contributing to more accurate up-stops by eliminating the undesirable effect of inertia in the motor and pump.

Another important feature of the invention resides in the provision of automatic means in the system for controlling the rate of deceleration of the car in its upward travel over all ranges of load carried by the car.

Another important feature of the invention resides in the provision of an improved pulsation eliminator in the system for absorbing fluid shock such as would otherwise cause jarring or vibration of the car and possible eventual damage to the components of the system as a whole.

Another important feature of the invention resides in the provision of an improved strainer at the outlet of the fluid reservoir or tank of the system, such strainer including means for preventing vortification of fluid in the tank and possible entry of air into the hydraulic fluid.

Another important feature of the invention resides in an improved construction of the hydraulic cylinder or jack of the elevator car, particularly from the standpoint of preventing leakage and wastage of fluid at the jack.

Another important feature of the invention lies in the arrangement of the various components of the system as a whole, whereby the system is better adapted to perform its intended function as compared to systems of conventional types.

With the foregoing objects and features in view and such other objects and features as may become apparent as this specification proceeds, the invention will be understood from the following description taken in conjunction with the accompanying drawings, wherein like characters of reference are employed to designate like parts and wherein for purposes of illustration FIGURE 1 is a diagrammatic view of the system as a whole, arranged in accordance with the invention;

FIGURE 8 is a side elevational view of the volume-pressure regulator used in the system;

FIG. 9 is a top plan view thereof;

FIGURE 10 is a vertical sectional view, taken substantially in the plane of the line 10—10 in FIGURE 8;

FIGURE 11 is a cross-sectional view, taken substantially in the plane of the line 11—11 in FIGURE 10;

FIGURE 12 is a perspective view of the piston used in the regulator shown in FIGURES 8–11;

FIGURE 13 is a vertical sectional view of the pulsation eliminator used in the system;

FIGURE 14 is a horizontal sectional view, taken substantially in the plane of the line 14—14 in FIGURE 13;

FIGURE 15 is a side elevational view of the pulsation eliminator;

FIGURE 16 is a fragmentary perspective view showing some of the components of the pulsation eliminator;

FIGURE 17 is a vertical sectional view of a strainer used in the manifold of the system;

FIGURE 18 is a side elevational view, partially in section, of the elevator car jack;

FIGURE 19 is a fragmentary vertical sectional detail thereof;

Figure 1:
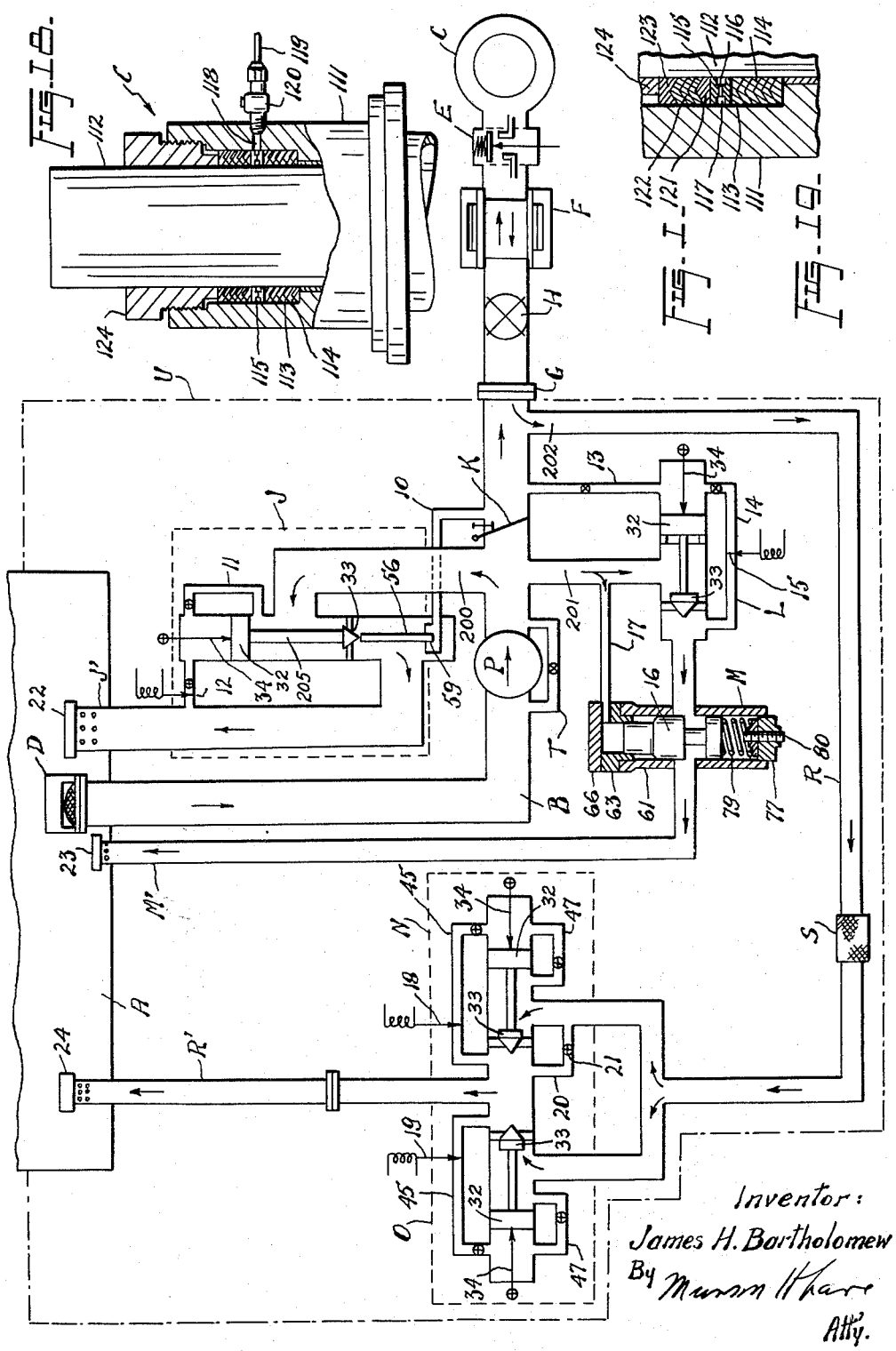
Figure 2:
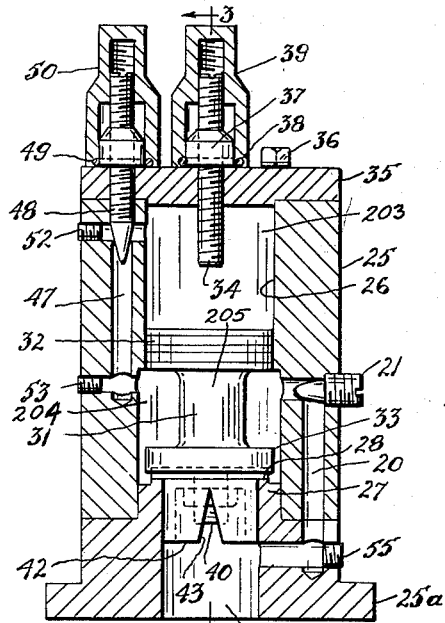
FIGURE 2 is a vertical sectional view showing a typical valve assembly used in the system.
Figure 3:
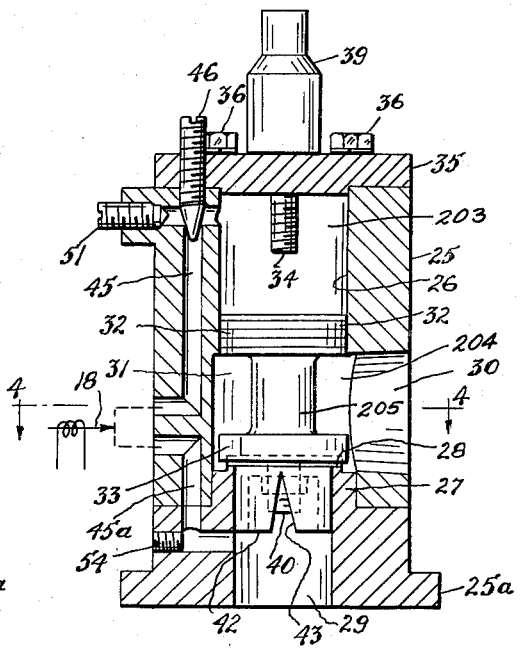
FIGURE 3 is a vertical sectional view, taken substantially in the plane of the line 3—3 in FIGURE 2.

With reference now to the accompanying drawings in detail, the construction, arrangement and operation of the entire system will first be described, whereupon separate descriptions will be given of the construction and operation of the major components.

THE SYSTEM

The operating system for hydraulic elevators in accordance with the invention is illustrated diagrammatically in FIGURE 1 and comprises a group of components which will be described in detail hereinafter. For purpose of general orientation, such components may be briefly identified as follows:

A represents a suitable reservoir or tank for hydraulic fluid, from the bottom of which extends a fluid delivery pipe or manifold B to a suitable hydraulic cylinder or jack C supporting the elevator car (not shown). Provided intermediate the pipe or manifold B is a motor driven pump P, protected by a strainer D on the pipe B inside the tank A.

A down-flow regulator E is provided on the pipe B adjacent the jack C, and a pulsation eliminator F is provided on the pipe B in advance of the regulator E. The pipe B is also equipped with a second strainer G and a shut-off valve H, located substantially as indicated.

An accelerating valve assembly J communicates with the manifold or pipe B through pipe 200 at a point adjacent the outlet of the pump P and a check valve K is provided on the manifold between the valve J and the strainer G. The valve assembly J has a discharge pipe J' returning to the bottom of the tank A. As will be apparent, the pipe 200 relieves pressure fluid from the pump to the tank A, by-passing the check valve K. The return line is restricted by the presence of valve 33, as will be more fully described hereinafter. Accordingly, the line 200 may be termed a pump by-pass line and the valve 33 may be referred to as a pump by-pass valve. Also connected to the manifold B at the pump side of the check valve K through pipe 201 is an up slow down valve assembly L cooperating with a volume-pressure unit M, having a discharge pipe M' returning to the bottom of the tank A.

The return of fluid from the jack C to the tank A is controlled by a down valve assembly N and by a levelling valve assembly O, these two valves being connected in parallel to a return pipe R which is connected to the manifold B at point 202 and constitutes a continuation of the manifold B at the jack side of the check valve K. The pipe R is provided with a strainer S and the outlets of the two valves N and O communicate with the bottom of the tank A through a pipe R..

The operation of the valve assemblies J, L, N and O as part of the system will be more fully described hereinafter, and the structural details of such valve assemblies will be more fully disclosed in connection with the descriptions of FIGS. 2 to 7 and 20.

The pump P is equipped with pressure relief means T which may be either built in the pump so as to by-pass from the outlet to the inlet thereof, or which may be in the form of a separate relief valve connecting the outlet side of the pump to the tank A.

It may be explained at this point that all the components of the system, including the tank A, enclosed within the dotted line U are preferably arranged into a compact structural unit which is in communication with the jack C only through the pipe B having the components E, F, G and H thereon, exteriorly of the unit U. As such, the components of the unit U are readily accessible for purposes of convenient inspection or repair, the unit U being of relatively small size so that it may be installed even in a small amount of space.

Conventional electrical controls (not shown) are provided at the various floors or levels served by the elevator as well as in the elevator car itself, these controls being adapted for remote actuation of the motor driving the pump P and for solenoids operating the valves J, L, N and O.

GENERAL OPERATION

(a) *Upward movement*

In brief, the operation of the system, and with particular reference to FIG. 1 of the drawing, may be described as follows: The elevator car is sustained in a still standing position at any particular floor or level by fluid pressure in the jack C, while the pump C is inactive and the check valve K and valve assemblies, L, N and O are closed. Under such circumstances the hydraulic fluid is prevented from returning to the tank A from the jack C by these closed valves.

When the electric control in the elevator car or on any one of the floors or levels is actuated so as to start the car on its upward travel, the motor driving the pump P is energized and fluid under pump pressure is delivered through the pipe B from the tank A toward the check valve K and through pipe 200 into the accelerating valve J. As long as the pump pressure is less than the static fluid pressure on the jack side of the check valve K, the valve K remains closed and fluid from the pump travels into the valve J. This valve is normally held open by fluid pressure in the jack C, acting through the medium of a puid conduit 10 extending from the valve J to the pipe B at the jack side of the check valve K. Thus, when the pump P starts, the bulk of the fluid delivered by the pump is returned to the tank A through the pipe J'. However, it will be also noted that a by-pass 11 is provided in the valve J and equipped with a solenoid valve unit 12 in communication with the pipe J'. With the solenoid valve 12 being closed, fluid pressure in the valve J builds up and the valve J gradually closes to cut off return of fluid to the tank A. With the closing of the valve J, the building up of fluid pressure in the pipe B gradually opens the check valve K as static pressure of the fluid on the jack side of the check valve is overcome and, as a result, fluid under increased pressure is admitted into the jack C to propel the elevator car upwardly.

When the elevator car reaches the higher floor or level at which it is intended to stop, the pump P is de-energized and the solenoid valve 12 is opened, thus returning the system to the initial car still-standing status as already explained.

However, this action, if performed abruptly, would have the result of imparting a jar or shock to the elevator car by virtue of its own momentum as well as inertia in the fluid pressure system itself. This undesirable condition is avoided by the provision of the up slow down valve assembly L and volume-pressure regulator M, which provide for a slowing down of upward car travel before the car reaches its intended stop position in a manner which is automatically responsive to the amount of weight carried by the car. As such, the valve L which is normally closed, is connected to the manifold B at the pump side of the check valve K, as is the regulator M. The valve L is provided with a by-pass 14 having a solenoid valve unit 15 thereon which is normally closed. The valve L is also connected by a duct 13 to the manifold B at the jack side of the check valve K. Before the car reaches its intended stop position, it contacts a suitable switch in the elevator shaft which opens the solenoid valve 15 and, in turn, the valve L itself. With the opening of this valve, a certain volume of fluid delivered by the pump P is by-passed back to the tank A through the pipe M' and, as a result, the volume of fluid delivered by the pump to the jack C is proportionately decreased and the speed of upward travel of the car is reduced so that the car travels at a slow rate to a stop.

It is essential that the low car speed be controlled automatically by the regulator M. The latter has a flow metering port adjustable as to size by a piston 16 which is responsive to fluid pressure existing in a line 17 communicating with the valve L and, consequently, the manifold B. When the car is heavily loaded, the fluid pressure in the manifold is relatively large and the piston 16 controls the rate of fluid flow through the regulator M so that the rate of car travel is relatively slow. On the other hand, when the load on the car is light, the fluid pressure in the manifold B is relatively small and the piston 16 increases the rate of fluid flow through the regulator so that the rate of car deceleration and in upward travel is relatively fast. Thus, it will be seen that the regulator M is self-adjusting over all ranges of load.

(b) *Downward movement*

Assuming now that the car is intended to travel in a downward direction from a still standing position, the check valve K is still closed, but actuation of suitable controls in the car or on the various floors or levels of the elevator simultaneously opens solenoid valve units 18, 19 of the valve assemblies N and O, respectively, thus opening both valves N and O, so that fluid from the jack C may then flow through the return pipes R, R' back to the tank A. When the car almost reaches its intended stop position on its downward travel, a suitable switch in the elevator shaft causes the solenoid unit 18 of the down valve N to close, thus also closing the valve N so that the rate of fluid flow back to the tank A is decreased to that permitted by the valve O only. As a result, the downward travel of the car is decelerated accordingly, and when the car reaches its intended stop position, another suitable switch in the elevator shaft closes the solenoid unit 19 and the levelling valve O, whereby the car is brought to a stop at the desired level.

It will be apparent from the foregoing that the operating system in accordance with the invention provides for efficient propulsion of the elevator car in both upward and downward directions and facilitates gradual starting and stopping in either direction in proportion to the weight of the car load. Moreover, the various valve assemblies J, L, N and O are provided with fine adjusting means, hereinafter detailed, whereby the operation of these valves may be pre-set in accordance with the requirements of each particular installation in terms of opening and/or closing of such valves to produce smooth, shockless car control.

Apart from the components already referred to, it may be briefly stated that the down-flow regulator E of any conventional type is in the nature of a check valve which prevents return of fluid from the jack C at an excessive rate, so that in the event of leakage or other damage in the return part of the system, the car does not "fall" or travel downwardly too rapidly. The pulsation eliminator F, on the other hand, is in the nature of a shock absorber wherein fluid pressure within the system, particularly the manifold B and the jack C, is afforded a certain amount of cushioning in order to assist the system in performing its function in the intended smooth manner and eliminating objectionable pump pulsation noise.

In the event of electric power failure in the controls for the various valves or other similar damage, means are provided for effecting lowering of the elevator car manually, these means comprising a by-pass 20 at the down valve assembly N. This by-pass is provided with a manually controlled valve 21 which is normally closed, but may be opened so as to permit escape of fluid from the pipe R through the pipe R' to the tank A around the valve N, in the event that flow of fluid through the valves N and O were not possible.

The strainer S in the return pipe R is of any conventional type, as is the shut-off valve H in the pipe B. The return pipes J', M' and R' are provided inside the bottom of the tank A with suitable baffles 22, 23, 24, respectively, as will be clearly apparent.

With the general arrangement and operation of the system as a whole thus being explained, the specific structure and operation of its essential components will now be described.

VALVE ASSEMBLY

The accompanying FIGURES 2–7 inclusive illustrate a typical valve assembly such as is used at the locations N and O in FIGURE 1, and also, with some modifications, at the locations J and L.

With reference to FIGURES 2–7, it will be observed that the valve assembly is substantially cylindrical in shape and comprises a housing 25 provided at its lower end with a flanged base portion 25a, the housing 25 having a central bore or chamber 26 and the base portion 25a having a diametrically reduced upper region 27 which extends into the lower end of the bore 26 and is formed with a valve seat 28 concentric with an outlet 29. An inlet 30 (FIG. 3), at one side of the housing 25, communicates with the bore 26, it being understood that the base portion 25a is secured to the housing 25 in any suitable conventional manner.

A piston 31, equipped with an upper head 32 provided with suitable packing and with a lower valve seat engaging head 33, is slidable in the bore 26, the extent of its movement in the upward direction, that is, away from the seat 28, being limited by a stop screw 34 extending trough a top cover 35 of the housing 25, to which the top cover is secured by suitable screws 36. The screw 34 is equipped with a lock nut 37 engageable with the cover 35 and to prevent leakage of fluid past the threads of the screw, a dome-shaped closure cap 39 is provided on the screw 37 and engages the cover 35. An annular seal 38 is provided at the lower edge of the cap 39, as shown. As shown the upper portion of chamber 203 of the bore 26 in which the upper piston head 32 reciprocates is of somewhat less diameter than the lower portion of chamber 204 of the bore 26 in which the lower piston head 33 reciprocates.

Figure 7:
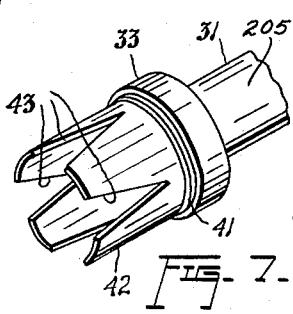
FIGURE 7 is a fragmentary perspective view of the piston.
Figure 6:
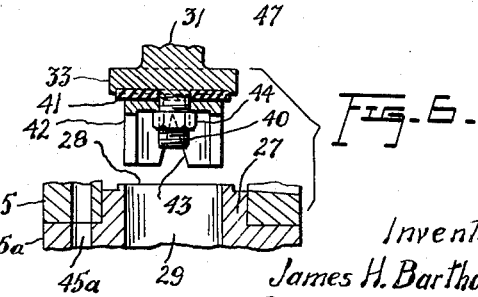
FIGURE 6 is a group fragmentary sectional view, showing the piston and piston seat of the valve.

As is best shown in FIGURES 6 and 7, the lower piston head 33 is formed with a downwardly projecting stud 40 on which is positioned a suitable sealing disc 41 and an inverted cup-shaped valve element 42, the periphery of the latter being provided with a plurality of inverted V-shaped notches 43. The valve element 42 as well as the sealing disc 41 are retained on the stud 40 by a nut 44 and the element 42 is slidably received in the aforementioned outlet 29, as shown.

Figure 5:
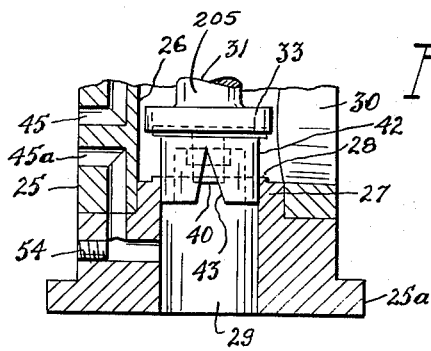
FIGURE 5 is a fragmentary vertical sectional view, similar to that shown in FIGURE 3 but illustrating the valve in its open position.
Figure 4:
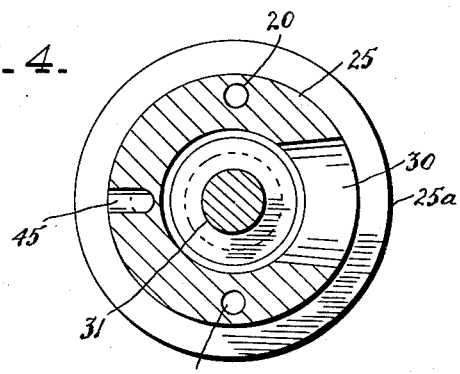
FIGURE 4 is a horizontal sectional view, taken substantially in the plane of the line 4—4 in FIGURE 3.

The size of the notches 43 is such that when the piston 31 is slid upwardly in the bore 26 of the body 25 as shown in FIGURE 5, the lower piston head 33 is raised above the seat 28 to such extent as to expose a substantial portion of the notches 43 and permit the flow of a relatively large volume of fluid therethrough from the inlet 30 and a portion of the bore 26 below the head 33 to the outlet 29. On the other hand, as the piston is slid downwardly toward the seat, the exposed portion of the notches 43 is progressively decreased, thus decreasing the flow of fluid accordingly, until the sealing disc 41 ultimately engages the seat and discontinues the flow of fluid through the valve.

The valve assembly, in accordance with its location and function in the system, also includes a plurality of by-pass ducts which communicate with the valve at opposite sides of its piston. One of such ducts is illustrated at 45, 45a, the duct portion 45 communicating with the bore 26 adjacent the cover 35 while the duct portion 45a communicates with the outlet 29 below the piston. The duct portions 45, 45a are brought to the outside of the valve housing, at which point they are provided with a suitable solenoid valve of conventional type, such as for example, any one of the aforementioned valve units 12, 15, 18 or 19, responsive to remote electrical control. The rate of flow of fluid through the ducts 45, 45a is regulated by a metering screw 46 extending through the cover 35 into the housing 25 and, if desired, this metering screw may be also equipped with fluid sealing means such as the above described means 38, 39.

The valve assembly may also include another by-pass duct 47 extending from the bore 26 above the piston to a point in the bore between the uper and lower piston heads 32 and 33, as illustrated. The duct 47 is provided with a metering screw 48, equipped with a sealing ring 49 and a closure cap 50, and both the aforementioned duct 45 and the duct 47 are equipped with suitable bleeding screws 51 and 52, 53, respectively. Similarly, the duct portion 45a is provided with a bleeding screw 54.

In the instance of the valve assembly N, the housing 25 is also equipped with the by-pass duct 20 extending from the bore 26 at a point between the upper and lower piston heads 32 and 33 to the outlet 29 below the piston, the duct 20 having a bleed screw 55 and the aforementioned manually controlled valve 21 thereon. It will be observed from the drawings that the inlet 30, as well as the ducts 47 and 20 are in communication with one another, at the region of the bore 26 between the piston heads 32 and 33, whereby flow of fluid through this inlet and ducts is possible without movement of the piston itself.

In the event the valve assembly is employed at the locations N and O, the ducts 45, 47 are arranged as shown in FIGURE 1. On the other hand, if the valve assembly is used at the location L, the duct 45 finds its equivalent in the by-pass 14 and the duct 47 in the by-pass 13. Finally, if the valve assembly is used at the location J, only the duct 47 is employed, which finds its equivalent in the by-pass 11.

As already stated, at the locations N and O the valve assemblies are normally closed, that is, the solenoid valve units 18 and 19 are closed and the pressure of fluid in the return pipe R retains the valve piston heads 33 against the seats 28. However, when suitable controls in the elevator car or on the various floors are actuated, the solenoid valve units 18 and 19 are opened, thus permitting flow of fluid from the pipe R through the inlets 30 of the valves and thence through the by-pass ducts 47 and 45 into the pipe R', simultaneously gradually relieving fluid pressure against the end portions 32 of the pistons 31 and permitting the pistons to gradually unseat themselves from the seats 28, until full flow of fluid is obtained through the valve outlets 29 into the pipe R' and the tank A.

Figure 20:
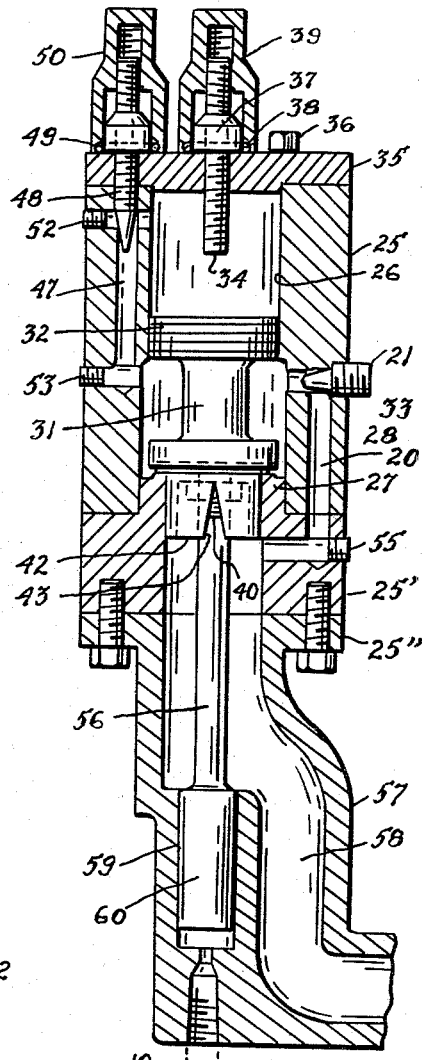
FIGURE 20 is a fragmentary vertical sectional view of the accelerating valve assembly used in the system.

The valve assembly as used at the location J is somewhat modified, particularly as shown in detail in FIGURE 20, wherein it will be observed that the aforementioned stud 40 of the piston 31 is contacted by a vertical stem 56 and the valve housing 25' is provided with a flanged base portion 25" whereby it is secured to an outlet extension 57 having an outlet passage 58 therein as well as a cylindrical chamber 59 for a piston 60 at the lower end of the stem 56. As will be noted the diameter of the stem 56 is substantially less than the diameter of the stem portion 205 of piston 31 connecting the upper and lower piston heads 32 and 33 (FIGS. 2, 3, 7 and 20) so that a greater area of the lower portion of the piston head 33 is exposed to the action of fluid pressure than is the exposed area above the head 33. Fluid under pressure is delivered from the manifold B through the conduit 10 to the chamber 59 for urging the piston 60 upwardly, whereby to normally retain the main piston of the valve J in its open position, as already described. Upon starting of the pump P, pressure of fluid developed in the manifold B gradually overcomes the pressure of fluid against the piston 60 at the remote side of the check valve K and permits the main piston of the valve J to close, thus gradually starting the elevator car on its upward travel.

With the valve assembly used at the location L, the arrangement is similar to that at the locations N and O, with the piston of the valve being normally closed until the solenoid valve unit 15 is energized to facilitate fluid flow through the by-pass ducts 13 and 14 to eventually open the valve and thereby reduce fluid flow in the manifold B so as to reduce the speed of the elevator car from high to low in its upward travel.

The various adjustments afforded by the metering screws 46 and 48 of the valve assembly, regardless of its location in the system, facilitate efficient control of fluid flow, so that the operation of the system may be set in exact accordance with the requirements of the particular installation where the system is used.

VOLUME-PRESSURE REGULATOR UNIT

The aforementioned volume-pressure regulator unit M is shown in detail in FIGURES 8–12 inclusive and embodies in its construction a cylindrical housing 61 provided with an axial bore 62 and with an extension piece 63 at its upper end, the extension piece having a tubular depending portion 64 which is disposed in the upper end portion of the bore 62. A suitable sealing ring 65 is provided at the junction of the extension piece 63 with the housing 61 and the extension piece is surmounted by a closure cap 66 which is secured thereto by suitable screws 67.

The housing 61 is provided intermediate the ends thereof with lateral projections accommodating, at diametrically opposite sides of the housing, a fluid inlet 68 and a fluid outlet 69, both of which are in communication with the bore 62. A piston 16 is slidable in the housing and includes a diametrically reduced intermediate portion 71, a base portion 72 equipped with a spring seat 73, and a head portion 74 provided with suitable packing 75. The base portion 72 may also be provided with packing, as shown at 76.

The reduced head portion 74 of the piston 16 is slidable in the depending portion 64 of the extension piece 63, while the remaining parts of the piston are slidable in the bore 62. A screw-threaded plug 77 is provided in the lower end of the bore 62 and is equipped with a spring seat 78, whereby a compression spring 79 may be retained on the seats 73 and 78 of the piston 16 and plug 77, respectively, to urge the piston upwardly in the bore 62. A stop screw 80 is adjustably positioned in the plug 77 to engage the spring seat 73 and limit the extent of downward travel of the piston and, if desired, a closure cap 81 may enclose the plug 77 and the screw 80 to prevent leakage of fluid past the threads of the screw.

The aforementioned fluid line 17 extends into the extension piece 63 whereby to establish communication between the manifold B and the chamber 62 above the head of the piston 16, it also being noted that the arrangement of parts is such that the lower end 70a of the piston body is disposed substantially at the level of the inlet 68 and outlet 69, so that when the piston is moved upwardly, the inlet and outlet ports become uncovered to a greater extent and permit the flow of a larger volume of fluid through the unit. On the other hand, when the piston is slid downwardly, the inlet and outlet ports become covered to a greater extent by the piston body and decrease the flow of fluid through the unit.

Inasmuch as the resiliency of the spring 79 is constant after proper adjustment by the screw-threading of the plug 77 in the bore 62, the position of the piston 16 in the bore is governed by the amount of fluid pressure acting on the piston head through the line 17 from the manifold B. Thus, when the elevator car is heavily loaded, the pressure in the manifold is relatively large and, through the line 17, exerts sufficient pressure on the piston 16 to slide the same downwardly against the action of the spring 79, thus correspondingly reducing the flow of fluid through the inlet 68 and outlet 69 and through the pipe M' back to the tank A, whereby the rate of car deceleration in upward travel is relatively slow.

On the other hand, when the load in the elevator car is relatively light, the fluid pressure in the manifold is relatively small and the piston 16 slides upwardly under the action of the spring 79 so as to increase the rate of flow of fluid through the pipe M' back to the tank A, whereby the rate of car deceleration in upward travel is relatively fast. It will be apparent that in this manner the regulator M automatically compensates for various car loadings in controlling the rate of car deceleration in upward travel.

PULSATION ELIMINATOR

The aforementioned pulsation eliminator F is shown in detail in FIGURES 13–16 inclusive and embodies in its construction a substantially flat, circular housing 82 provided with a pair of cover plates 83 which are secured to the housing by suitable screws 84, gaskets 85 being interposed between the cover plates and the housing as shown.

The housing 82 is provided at its diametrically opposite sides with connecting ports 86 to the aforementioned valve H and regulator E, and it will be noted that the cover plates 83 are formed with recesses 83' to accommodate the pulsation absorbing means, now to be described.

Apart from the gaskets 85, which may be of rubber, or the like, the pulsation absorbing means comprises an "Isomode" pad 87 made in accordance with the teachings of United States Patent No. 2,534,137, and two layers 88, 89 of strips of rubber, or the like, the layer 89 being less resilient than the layer 88. The strips in the two layers extend at right angles to each other and the strips in each layer are spaced apart to some extent so as to provide air spaces therebetween. Consequently, pulsations of fluid in the system can exert outward pressure against the gaskets 85, "Isomode" pads 87 and layers of strips 88, 89, so that they become progressively absorbed within the configuration of the pads and within the air spaces between the two layers of strips of different resiliency. Thus, pulsations in the fluid are eliminated and no jarring or vibration is transmitted to the elevator car.

STRAINER D

Figure 21:
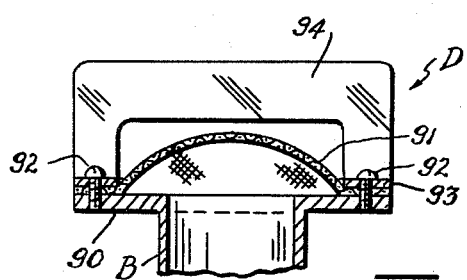
FIGURE 21 is a vertical sectional view of the tank strainer.
Figure 22:
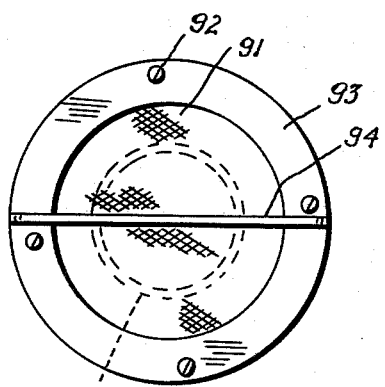
FIGURE 22 is a top plan view of the tanks trainer.

The strainer D for fluid leaving the tank A is shown in detail in FIGURES 21 and 22, from which it will be apparent that the strainer comprises a suitable flange 90 secured or otherwise connected to the manifold pipe B and having a convexo-concave screen 91 mounted thereon by a plurality of screws 92 and a clamping ring 93. Moreover, an inverted substantially U-shaped baffle plate 94 is welded or otherwise secured to the ring 93 in such position that it extends transversely of and above the screen 91, as shown.

As is well known, fluid flowing out of a tank such as the tank A develops a vortex above its point of discharge, and if the baffle plate 94 were not provided above the screen 91, it would be possible to suck air from the tank into the manifold B and into the hydraulic system as a whole. However, the provision of the baffle plate eliminates any such possibility, since vortification of fluid in the tank is prevented by the presence of the baffle plate.

STRAINER G

As shown in detail in FIGURE 17, the strainer G on the manifold B is housed in an annular recess 95 formed in a flanged portion 96 of the manifold. The strainer comprises a pair of apertured plates 98 having therebetween a screen 99, these plates and screen being set as a unit between a pair of gaskets 97 in the recess 95 so that the strainer may be readily disassembled for purposes of cleaning or inspecting the screens by removing the bolts 100 in the flanged portion 96 of the manifold.

STRAINER G'

Figure 23:
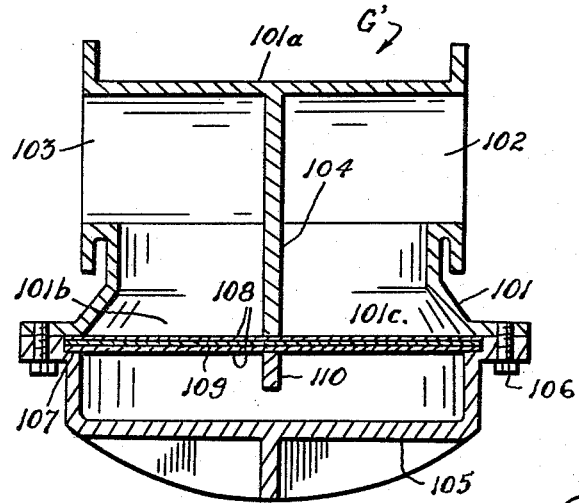
FIGURE 23 is a vertical sectional view showing a modified form of the manifold strainer, such as may be used in place of the strainer shown in FIGURE 17.

FIGURE 23 of the drawings illustrates in detail a strainer G' such as may be used in the system as a modification of or in substitution for the strainer G, already described.

As such, the strainer G' comprises a housing 101 having an upper portion 101a provided with fluid passages 102, 103 and also equipped with a vertical partition 104 between these passages. A hollow base 105 is secured to the housing 101 by suitable screws 106 and is provided with an annular groove 107 to receive a pair of apertured discs 108 having a screen 109 therebetween. The discs 108 and screen 109 are clamped against the lower edge of the housing 101 by the base 105 and are similarly clamped against the lower end of the partition 104 by a transverse partition member 110 provided in the base.

In operation, as fluid passes from the tank A through the passage 103, impurities in the fluid are caught on top of the screen unit 108, 109, in the portion 101b of the housing 101. On the other hand, fluid passing from the jack C enters the passage 102 and impurities therein are caught on top of the screen unit in the portion 101c of the housing. The screens 109 may be subjected to periodic cleaning upon removing the base 105 from the housing 101. It will also be noted that the hollow base 105 also functions as a sediment chamber for impurities, if any, gathering at the underside of the screen.

ELEVATOR CAR JACK

The aforementioned jack C is shown in some detail in FIGURES 18 and 19 of the drawings and, generally, comprises a hydraulic cylinder 111 having therein a slidable piston 112 connected to the bottom of the elevator car.

The invention concerns itself primarily with provision of improved means for preventing leakage of fluid past the piston, these means being contained in an annular chamber 113 in the upper end portion of the cylinder 111. The lower portion of this chamber contains a set of conventional chevron packing rings 114 of hard rubber, or the like, surmounted by a metallic ring 115 having a set of circumferentially spaced, restricted fluid passages 116 therein. These passages communicate with an annular groove 117 at the outer periphery of the ring 115 and the cylinder 111 is provided with a fluid outlet 118 which is in communication with the groove 117.

An outlet line 119, equipped with a suitable reverse flow check valve 120, extends from the outlet 118 either to a suitable point of fluid disposal or back to the tank A, if conservation of fluid is a critical factor.

Positioned on top of the ring 115 are, consecutively, a hard rubber ring 121, a set of soft rubber chevron rings 122 and a top ring 123 of hard rubber, the various rings being retained in place in the chamber 113 by a packing gland 124 of conventional type.

The arrangement of parts is such that fluid under pressure below the piston 112 has a tendency to leak past the rings 114 and through the passages 116 into the groove 117 for disposal or salvaging through the line 119, rather than leaking past the wall of the piston 112 to the outside of the cylinder 111.

It will be apparent from the foregoing that the invention contemplates several improvements at various points of the hydraulic elevator system, whereby the construction of the system is materially simplified, its operation improved and the ease of its maintenance greatly facilitated.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In an operating system for hydraulic elevators, the combination of a fluid reserve tank, a jack, a manifold having a fluid receiving end in communication with said tank and connected at its other end to said jack, a pump in said manifold, a check valve in the manifold between said pump and said jack to permit flow of fluid only in the direction of the jack, said check valve being closed by fluid pressure in the jack when said pump is inactive, a restricted pump by-pass line extending to said tank from a point in the manifold at the pump side of the check valve, a pump by-pass valve in said pump by-pass line, means responsive to holding pressure in said manifold downstream of said check valve for holding said pump by-pass valve open until the pump builds up sufficient pressure to open the check valve, means responsive to pressure developed by the pump upstream of the check valve for progressively creating a pressure which gradually closes the pump by-pass valve, and controlled means for relieving pressure from the jack side of said check valve to permit downward travel of the jack.

2. In an operating system for hydraulic elevators, the combination of a fluid reserve tank, a jack, a manifold having a fluid receiving end in communication with said tank and connected at its other end to said jack, a pump in said manifold, a check valve in the manifold between said pump and said jack to permit flow of fluid only in the direction of the jack, said check valve being closed by fluid pressure in the jack when said pump is inactive, means for returning fluid from the jack side of said check valve to the tank to permit downward travel of the jack, a by-pass line extending to said tank from a point in said manifold at the pump side of said check valve, a normally open accelerating valve provided in said by-pass line, means responsive to fluid pressure in the jack for holding said accelerating valve open whereby fluid delivered by said pump may be returned to said tank when fluid pressure at the jack side of said check valve is greater than at the pump side thereof, and remote control means for closing said accelerating valve whereby fluid pressure may be gradually built up by the pump at the pump side of the check valve and gradually open the latter against the fluid pressure in said jack, together with a second by-pass line extending to said tank from a point in said manifold at the pump side of said check valve, a normally closed up slow-down valve provided in said second by-pass line, means responsive to fluid pressure in said jack for holding said up slow-down valve closed whereby all the fluid delivered by said pump may be used to propel the jack upwardly at a relatively fast rate, and remote control means for opening said up slow-down valve whereby a portion of the fluid delivered by the pump toward the jack may be returned to said tank for slowing down the rate of upward travel of the jack.

3. In an operating system for hydraulic elevators, the combination of a fluid reserve tank, a jack, a manifold having a fluid receiving end in communication with said tank and connected at its other end to said jack, a pump in said manifold, a check valve in the manifold between said pump and said jack to permit flow of fluid only in the direction of the jack, said check valve being closed by fluid pressure in the jack when said pump is inactive, means for returning fluid from the jack side of said check valve to the tank to permit down travel of the jack, a by-pass line extending to said tank from a point in said manifold at the pump side of said check valve, a normally open accelerating valve provided in said by-pass line, means responsive to fluid pressure in the jack for holding said accelerating valve open whereby fluid delivered by said pump may be returned to said tank when fluid pressure at the jack side of said check valve is greater than at the pump side thereof, and remote control means for closing said accelerating valve whereby fluid pressure may be gradually built up by the pump at the pump side of the check valve and gradually open the latter against the fluid pressure in said jack, together with a second by-pass line extending to said tank from a point in said manifold at the pump side of said check valve, a normally closed up slow-down valve provided in said second by-pass line, means responsive to fluid pressure in said jack for holding said up slow-down valve closed whereby all the fluid delivered by said pump may be used to propel the jack upwardly at a relatively fast rate, and remote control means for opening said up slow-down valve whereby a portion of the fluid delivered by the pump toward the jack may be returned to said tank for slowing down the rate of upward travel of the jack, together with a volume-pressure regulator provided in said second by-pass line, said regulator including valve means for varying the rate of fluid flow through said second by-pass line, and means automatically responsive to said fluid pressure in said jack for respectively opening and closing said valve means in response to a decrease and increase of fluid pressure in the jack when the check valve is closed whereby to respectively increase and decrease the rate of fluid flow through the second by-pass line.

4. In an operating system for hydraulic elevators, the combination of a fluid reserve tank, a car jack, a manifold having a fluid receiving end in communication with said tank and connected at its other end to said jack, a pump in said manifold, a check valve in the manifold between said pump and the jack to permit flow of fluid only in the direction of the jack, a by-pass line extending to said tank from a point in said manifold at the pump side of the check valve, valve means in said by-pass line, means responsive to manifold fluid pressure at the jack side of the check valve for retaining said valve means open, remote control means for closing said valve means, a return line extending to said tank from a point in said manifold between the check valve and said jack, and valve means provided in said return line, together with a second by-pass line for returning fluid to said tank from a point in said manifold at the pump side of said check valve, and valve means provided in said second by-pass line for controlling flow of fluid therethrough, together with second valve means provided in said second by-pass line for controlling the flow of fluid therethrough, and means for automatically opening and closing said second valve means in response to decrease and increase of fluid pressure existing in said manifold under a load on said jack when said check valve is closed.

5. In an operating system for hydraulic elevators, the combination of a fluid reserve tank, a car jack, a manifold having a fluid receiving end in communication with said tank and connected at its other end to said jack, a pump in said manifold, a check valve in the manifold between said pump and said jack to permit flow of fluid only in the direction of the jack, means for returning fluid from the jack side of said check valve to said tank to facilitate downward travel of the jack, a by-pass line extending to said tank from a point in said manifold at the pump side of said check valve, valve means in said by-pass line, means responsive to manifold fluid pressure at the jack side of the check valve for retaining said valve means open when said pump is first energized, remote control means for closing said valve means whereby fluid pressure may be built up by the pump at the pump side of the check valve and gradually open the check valve against static fluid pressure at the jack side of the check valve, and means auxiliary to said by-pass line for returning fluid to said tank from a point in said manifold at the pump side of the check valve, whereby to gradually slow down upward travel of the jack, said last mentioned means including a second by-pass line extending to said tank from a point in said manifold at the pump side of said check valve, and remotely controlled valve means provided in said second by-pass line together with a second valve means provided in said second by-pass line for controlling the flow of fluid therethrough and means for automatically opening and closing said second valve means in response to decrease and increase of fluid pressure existing in said manifold under a load on said jack when said check valve is closed.

6. In an operating system for hydraulic elevators, the combination of a fluid reserve tank, a jack, a manifold having a fluid receiving end in communication with said tank and connected at its other end to said jack, a pump in said manifold, a check valve in the manifold between said pump and said jack to permit flow of fluid only in the direction of the jack, said check valve being closed by fluid pressure in the jack when said pump is inactive, a restricted pump by-pass line extending to said tank from a point in the manifold at the pump side of the check valve, a pump by-pass valve in said pump by-pass line, means responsive to holding pressure in said manifold downstream of said check valve for holding said pump by-pass valve open until the pump builds up sufficient pressure to open the check valve, means responsive to pressure developed by the pump upstream of the check valve for progressively creating a pressure which gradually closes the pump by-pass valve, and controlled means for relieving pressure from the jack side of said check valve to permit downward travel of the jack, together with a second by-pass line for returning fluid to said tank from a point in said manifold at the pump side of said check valve, and valve means provided in said second by-pass line for controlling flow of fluid therethrough.

7. In an operating system for hydraulic elevators, the combination of a fluid reserve tank, a jack, a manifold having a fluid receiving end in communication with said tank and connected at its other end to said jack, a pump in said manifold, a check valve in the manifold between said pump and said jack to permit flow of fluid only in the direction of the jack, and check valve being closed by fluid pressure in the jack when said pump is inactive, a restricted pump by-pass line extending to said tank from a point in the manifold at the pump side of the check valve, a pump by-pass valve in said pump by-pass line, means responsive to holding pressure in said manifold downstream of said check valve for holding said pump by-pass valve open until the pump builds up sufficient pressure to open the check valve, means responsive to pressure developed by the pump upstream of the check valve for progressively creating a pressure which gradually closes the pump by-pass valve, and controlled means for relieving pressure from the jack side of said check valve to permit downward travel of the jack, together with a fluid pulsation eliminator provided in said manifold.

8. In an operating system for hydraulic elevators, the combination of a fluid reserve tank, a jack, a manifold having a fluid receiving end in communication with said tank and connected at its other end to said jack, a pump in said manifold, a check valve in the manifold between said pump and said jack to permit flow of fluid only in the direction of the jack, means for returning fluid from the jack side of said check valve to said tank to facilitate downward travel of the jack, a by-pass line extending to said tank from a point in said manifold at the pump side of said check valve, a normally closed up slow-down valve provided in said by-pass line whereby all the fluid delivered by said pump may be used to propel the jack upwardly at a relatively fast rate, remote control means for opening said up slow-down valve whereby a portion of the fluid delivered by the pump toward the jack may be returned to the tank for slowing down the rate of upward travel of the jack, a volume-pressure regulator provided in said by-pass line, said regulator including valve means for varying the rate of fluid flow through the by-pass line, and means responsive to fluid pressure in said jack for respectively opening and closing said valve means in response to a decrease and increase of fluid pressure in the jack when the check valve is closed whereby to respectively increase and decrease the rate of fluid flow through said by-pass line.

References Cited in the file of this patent

UNITED STATES PATENTS

| Number | Name | Date |
|---|---|---|
| 276,332 | Baldwin | Apr. 24, 1883 |
| 1,001,118 | Alden | Aug. 22, 1911 |
| 1,028,807 | Brown | June 4, 1912 |
| 1,140,758 | Miller | May 25, 1915 |
| 1,199,847 | Wilkins | Oct. 3, 1916 |
| 1,204,171 | McKay | Nov. 7, 1916 |
| 1,399,013 | Fleener | Dec. 6, 1921 |
| 1,694,770 | Cram | Dec. 11, 1928 |
| 1,908,362 | Jacobs et al. | May 9, 1933 |
| 2,264,375 | Hill et al. | Dec. 2, 1941 |
| 2,265,800 | Connor et al. | Dec. 9, 1941 |
| 2,280,291 | Jaseph | Apr. 21, 1942 |
| 2,319,125 | Grote | May 11, 1943 |
| 2,355,164 | Jaseph | Aug. 4, 1944 |
| 2,417,947 | Reedy | Mar. 25, 1947 |
| 2,485,349 | Barr | Oct. 18, 1949 |
| 2,495,693 | Byrd et al. | Jan. 31, 1950 |
| 2,553,045 | Jaseph | May 15, 1951 |
| 2,588,555 | Molloy | Mar. 11, 1952 |
| 2,609,001 | Hebard | Sept. 2, 1952 |